United States Patent [19]

Grove

[11] Patent Number: 4,910,396
[45] Date of Patent: Mar. 20, 1990

[54] OPTICAL SHUTTER SWITCHING MATRIX

[76] Inventor: Charles H. Grove, 4343 Horseshoe Bend, Merritt Island, Fla. 32953

[21] Appl. No.: 262,851

[22] Filed: Oct. 21, 1988

[51] Int. Cl.$^4$ .............................................. G01D 5/34
[52] U.S. Cl. .................................... 250/229; 350/356
[58] Field of Search ................ 250/227, 229; 340/763; 350/96.16, 356; 455/610, 612

[56] References Cited

U.S. PATENT DOCUMENTS

| | | | |
|---|---|---|---|
| 3,924,931 | 12/1975 | Cheo | 350/356 |
| 4,185,274 | 1/1980 | Giallorenzi | 350/356 |
| 4,316,196 | 2/1982 | Jacobs | 350/356 |
| 4,381,881 | 5/1983 | Bell | 350/96.16 |
| 4,410,240 | 10/1983 | Medernach | 350/356 |
| 4,442,425 | 4/1984 | Eibner | 250/229 |
| 4,504,921 | 3/1985 | Nasuta et al. | 350/356 |
| 4,601,537 | 7/1986 | Saccocio | 340/763 |
| 4,675,702 | 6/1987 | Gerber | 350/356 |

*Primary Examiner*—David C. Nelms
*Assistant Examiner*—Stephone B. Allen
*Attorney, Agent, or Firm*—John R. Manning; Charles E. B. Glenn; James O. Harrell

[57] ABSTRACT

A switching matrix enables switching of optical signals from any of a plurality of optical input paths to selected optical output paths, without requiring physical re-connecting of the inputs or outputs. Plural broad-band optical waveguides are defined preferably in otherwise non-transmissive quartz crystalline wafers, to provide relatively high signal isolation. The wafers are fused to electronic shutter windows situated in an array and discretely operable under processor x-y address control. Optical signals passed through actuated electronic shutter windows are summed in output wafers, having waveguide structure generally reverse to that of the input quartz wafers. Through selected segment actuation, optical signals from selected optical input paths may be transmitted or blocked at the electronically controlled shutter array, for being output on selected optical output paths. Alternatively, fiber optic bundles may replace input or output quartz wafers. The switching matrix is useful as a switching module which may be variously associated in series and/or parallel connections for obtaining a desired number of switching channels, and required levels of signal separation therewith. Input/output signal characteristics and parameters are maintained by power summation at the outputs with automatic gain control, regardless of the number of paths or the like selectively summed in a given output. Connectors may be used in conjunction with the optical input and output paths, whereby both electrical and optical signals may be switched. Various modules may include converters as built-in features, so as to meet particular applications.

19 Claims, 3 Drawing Sheets

OPTICAL SHUTTER SWITCHING MATRIX

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

The present invention in general concerns a switching device, and more particularly concerns an optical shutter switching matrix useful for controllably re-configuring interconnections between selected optical input paths and optical output paths, without requiring physical re-connection of such paths.

Heretofore, multiplexer/switcher systems have often comprised large, bulky arrays of mechanical relays or electronic solid state switches. Where numerous channels of electrical signals must be switched, such as an array of 100 inputs and 100 outputs, the sheer size and weight of such prior switching systems presents problems.

In addition to large size and weight problems noted above, inherent limitations in the electrical signal isolation capabilities (both input-to-output and channel-to-channel), bandwidth or frequency response limitations, and interface control for reconfiguring interconnections to achieve desired input/output set-ups, pose additional problems.

To a certain extent, some of the foregoing problems (e.g., signal isolation, bandwidth) are diminished by the adoption of optical signal links, such as fiber optics (the use of which is generally known), instead of more conventional electrical signal linkages, requiring wires, cables, electrical contacts, and the like. While fiber optic technology offers improved signal isolation and bandwidth characteristics and fewer impedance problems, compared to corresponding electrical wire technology, switching difficulties still persist where communication or control link-ups require multi-port interfaces which from time to time must be reconfigured.

SUMMARY OF THE INVENTION

The present invention recognizes and addresses aspects of switching matrices particularly adapted for use with optical fiber technology, or optical signals. Accordingly, it is a general object of the present invention to provide an improved apparatus for switching optical signals from selected optical inputs to selected optical outputs.

It is a more particular object of the present invention to provide such a device, which also is small in size, and can operate on low power, while providing high isolation, broad-band signal switching capabilities. It is yet a more particular object of the present invention to provide such a device which may serve as a modular building block, for combination with similar devices in various parallel and/or series configurations for providing desired numbers of inputs and outputs, and desired levels of signal separation therewith.

It is yet another object of the present invention to provide such a device which is suitable for wide range of electronic applications where high speed switching, broad-band transmission, modulation, multiplexing, or switching techniques are desired.

It is another object of the present invention to provide an optical shutter switching matrix which obviates the need for the above-mentioned mechanical-based and semiconductor matrix technology switching devices. Thus, one object of the present invention is to provide an improved switching matrix for replacement of the aforementioned conventional arrays, which saves space and power, while providing improved signal transmissions by enabling use of fiber optic technology with switching modules therefor.

While different aspects and features of the present invention may be variously combined for providing certain alternative embodiments in accordance with the present invention, several exemplary embodiments having different combinations of features are disclosed herewith. One such exemplary embodiment concerns an apparatus for switching selected optical inputs to selected optical outputs, comprising m number of optical inputs, each of such inputs respectively split into n number of optical sub-part rows and disposed so as to constitute an n row by m column optical matrix; planar shutter means operatively associated with the optical matrix, with an array of n by m segments spaced for respective matching alignment with sub-parts of the n by m optical matrix, the transparency of each segment being respectively controllable, and the position of each segment being uniquely associated with one of the optical sub-parts so as to enable control of optical signals therethrough eanating from a selected optical input; and n number of optical summation means for respectively summing optical signals selectively output through respective n rows of the planar shutter means array, so as to form n number of respective optical outputs, whereby selected control of the planar shutter means segments permits optical signal applied to selected of the m optical inputs to be optically transmitted through the shutter mean to selected of the n optical outputs.

Another exemplary construction in accordance with the present invention is directed to an optical shutter switching matrix for switching optical signals associated with any one of a plurality of optical input paths to any one of a plurality of optical output paths, such switching matrix comprising a plurality of optical input means, each one of such input means having a respective optical input path and further having respective splitter means for splitting its optical input path into a number of input sub-paths; a plurality of optical output means, oriented perpendicularly to the optical input means, each one of such output means having a respective optical output path and further having respective summation means for summing a number of output sub-paths to form its respective optical output path; an electrically-controllable optical shutter matrix means, having an array of discrete, controllably transparent segments, such shutter matrix means being situated between the optical input means and the optical output means so that the optical input sub-paths and the optical output sub-paths respectively align on opposite sides of such segments; and shutter matrix segment control means for selectively controlling optical transmission through each respective segment of the optical shutter matrix means, so that optical signals directed along selected optical input paths may be switched to selected optical output paths.

Yet another exemplary construction comprising an embodiment of the present invention includes a device for electronically re-configuring interconnections between selected broad-band optical inputs and selected broad-band optical outputs, without requiring physical re-connecting of such inputs or outputs, and while maintaining relatively high signal isolation input-to-output and channel-to-channel, such device comprising a plurality of parallel, spaced input quartz wafers, each input wafer having etched optical splitter path means for receiving a respective optical input and splitting same into a plurality of optical sub-inputs distributed in alignment along a given edge of the respective wafer; a planar shutter panel, oriented perpendicularly to the input wafers and situated along the given edges thereof, such panel having an array of discretely-controllable segments, the optical transmissiveness of which may be respectively electrically controlled, such segments being formed in the shutter panel so as to respectively correspond to and align with the optical sub-inputs along the given edges of the input wafers; a plurality of parallel, spaced output quartz wafers mutually perpendicular with both the input wafers and the planar shutter panel, each output wafer having etched optical summer means for receiving respective optical sub-outputs distributed in alignment along a given edge of the respective wafer, and for power summing same into respective optical outputs for each output wafer, such output wafers being situated with their respective given edges adjacent the planar shutter panel such that the optical sub-outputs uniquely correspond to and align with the planar shutter panel segments; and segment control means for electrically controlling optical transmissions through the respective shutter panel segments, whereby a selected optical input is interconnected with a selected optical output by appropriate control of the shutter panel segment which uniquely interfaces between the optical sub-inputs associated with such selected optical input and the optical sub-outputs associated with such selected optical output.

Those of ordinary skill will appreciate certain modifications and variations which may be practiced in accordance with the present invention. Though not expressed in detail herein, such modifications may include, but are not limited to, the substitution of functionally equivalent structures, or the reversal of various features and elements of the invention. All such variations and modifications are intended to come within the spirit and scope of the present invention by virtue of present reference thereto, various exemplary details of the invention being discussed further below.

BRIEF DESCRIPTION OF THE DRAWINGS

A full and enabling disclosure of the present invention, including the best mode thereof, is set forth in the remainder of the present specification, together with reference to the accompanying drawings, in which.

Figure 1:
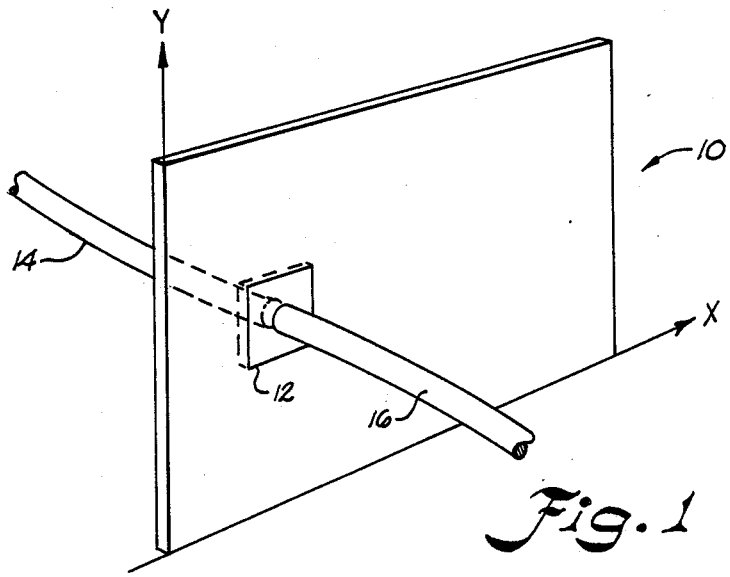
FIG. 1 illustrates general aspects of a planar shutter mans in accordance with the present invention.

Repeat use of given reference characters in the following specification and appended drawings is intended to represent same or analogous features or elements of the present invention.

DETAILED DESCRIPTION OF THE PREFERRED EMBODIMENTS

Various constructions and configurations may be provided as embodiments in accordance with the present invention. Generally common to each of such respective, different embodiments is a shutter means feature, such as the planar shutter means 10 illustrated in present FIG. 1. In general, such shutter means is preferably of planar construction, and is provided with a plurality of discrete segments, such as segment 12, which have controllable optical transmission characteristics. Opto-electronic transmissive shutter windows, such as each segment 12, are preferably situated relative an X-Y coordinate system for processor controlled respective selection and actuation. Alternatively, shutter means 10 may be non-planar, with its segments aligned out of a coordinate axis system.

In one exemplary embodiment, shutter means 10 may comprise a planar liquid crystal display, having numerous segments which may be actuated with control lines and processor control means((not shown in present FIG. 1). In order to perform its shutter function with meaningful results, fiber optic cables 14 and 16, or other functionally equivalent optical waveguides, are uniquely associated with controllable transmissive segment 12, on opposite sides thereof. In this manner, an optical signal directed along one of the fiber optic cables (such as cable 14) can be selectively transmitted through shutter means 10, particularly through segment 12 thereof, and into fiber optic cable 16 by selected actuation (i.e. optical transmissiveness) of segment 12. The precise protocol of such actuation can be varied. For example, segment 12 when unactuated may be normally opaque, and then rendered optically transmissive (i.e. transparent) upon actuation, or vice versa.

Though not illustrated in FIG. 1 for purposes of clarity, it is to be understood by those of ordinary skill in the art that a plurality of segments like segment 12 may be disposed in planar shutter means 12, each having discrete actuation capabilities, and each being uniquely associated with a pair of optical waveguide means on either side thereof so that actuation of such respective segment controls the transmission of optical signals between such fired optical waveguide means.

While the illustration of FIG. 1 presents one aspect of the present invention, it is to be further understood that optical input paths represented by fiber optic cable 14 preferably correspond to or comprise a sub-path or sub-part which is power split off from a given optical input path. In other words, other segments in shutter means 10 may receive identical sub-parts derived from a common optical input path, but each such optical input sub-path will be uniquely associated with respectively different optical output sub-paths. Thus, while optical input paths are split, optical output paths are formed by optically power summed sub-paths or sub-parts. Such power summation may be maintained at the outputs with automatic gain control (AGC) so that input/output signal characteristics and parameters are maintained regardless of how many sub-paths are selectively summed to a given output.

For every unique pairing of a given optical input sub-path derived from a given optical input path, and an optical output sub-path associated with a given optical output path, there is a controllable shutter segment interposed therebetween. A sufficient number of such segments are formed (preferably in an array) to account for all possible input to output combinations. Thus, selected actuation of the segments permits optical signals to be routed from a selected optical input path and selectively transmitted through the shutter means to any one (or more) selected optical output path.

Figure 2:
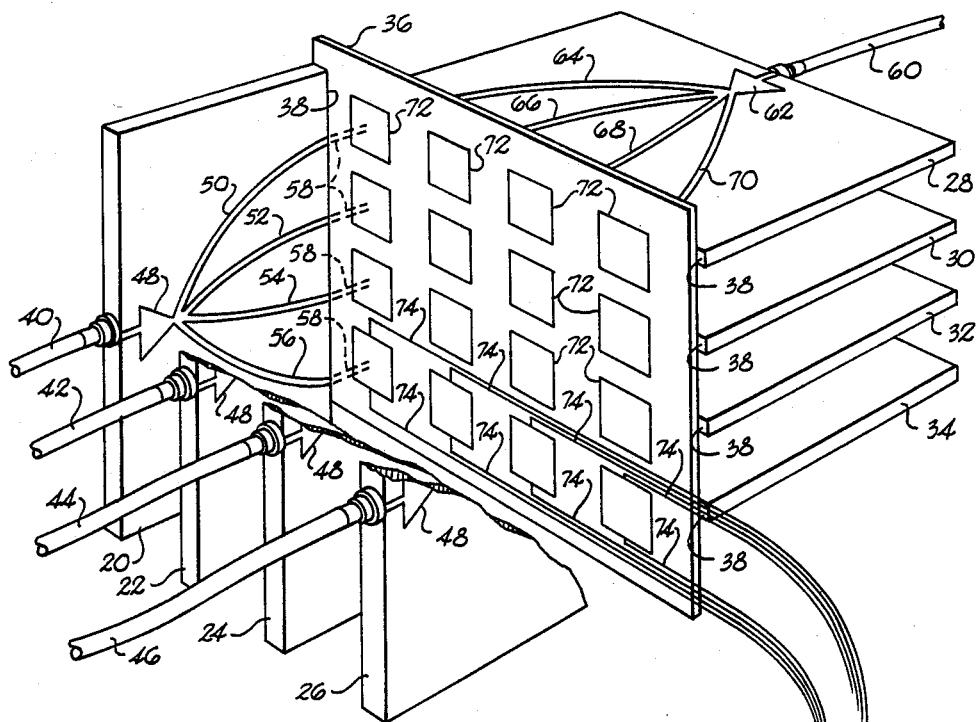
FIG. 2 illustrates, in partial cut-away, diagramatic structure for a 4 by 4 array embodiment in accordance with the present invention.

Applying the foregoing features, various alternative embodiments of the present invention may be constructed. FIG. 2 represents, in partial cut-away, an exemplary such construction, particularly adapted for operation as an n by m array of rows and columns, respectively. Both m and n in this exemplary embodiment are four, though different numbers of rows and columns respectively, may be practiced in accordance with broader aspects of the present invention. Since a respective input path is associated with each one of either the rows or columns, and each respective output path is associated with the complement thereof, the embodiment of FIG. 2 is particularly adapted for providing four input paths and four output paths, with optical signals being switchable thereamong (input to output) by selected operation of the FIG. 2 embodiment shutter means.

Though the input and output side orientations of given embodiments may be reversed from that illustrated in present FIG. 2, the plurality of parallel, spaced, vertically aligned members 20-26 represent the four (m number) of columns and inputs, while the plurality of parallel, spaced, horizontally oriented members 28-34 comprise the four (n number) of rows and outputs. In the presently discussed preferred embodiment, planar members 20-34 comprise generally non-optically transmissive quartz crystalline wafers. Etched or otherwise formed pathways are defined generally within the plane of each quartz wafer, and filled with optical glass for forming optical waveguide means for relatively high isolation optical signal transmission through the respective wafers.

Wafers 22-26 are generally shown in cut-away to permit more full illustration of planar shutter means 36, discussed more fully below. Wafers 20 and 28 are essentially fully visualized in FIG. 2, so as to illustrate examples of both input and output wafers. As shown, they are preferably oriented mutually perpendicularly with planar shutter means 36, and respectively situated on opposing sides of such planar shutter means. Given side edges 38 of the respective quartz wafers 20-34 are situated adjacent to planar shutter means 36, and in particular alignment therewith, as all discussed more fully below.

Each wafer or optical input means 20-26 has respectively associated therewith input paths 40-46. Whenever members 40-46 comprise fiber optic cables, such input paths comprise optical input paths. In such instance, no conversion of an electrical signal to an optical signal is required in order for splitter means 48 ((a plurality of which are respectfully associated with each input wafer) to split its respective optical input path into a plurality of input sub-paths or sub-parts distributed along the given edge 38 of each wafer. In particular, subpaths 50-56 may be defined by the above-mentioned optical cut glass embedded within the respective quartz wafers, the given edges of which may be brought into direct contact (and preferably fused) to the surface of planar shutter means 36. Alternatively, such given edges may be slightly separated from a shutter means and sub-paths continued thereto with fiber optic extensions 58 or their functional equivalents for ensuring operative interaction with planar shutter means 36.

While splitter means 48 may operate directly on optical signals for power splitting same into the various illustrated sub-paths or sub-parts thereof, electrical converting and splitting may also be practiced as optional features of the present invention, as more fully discussed hereinbelow and represented with FIGS. 3 and 4. Briefly, an example of an electrical converter means for converting electrical signals into optical signals, which may be split into sub-parts, is represented by the LED transmitters disclosed in Bell (U.S. Pat. No. 4,381,881), while an example of converter means for collecting and converging optical signals into electrical signals is represented by the injection laser diode devices also disclosed in such patent.

The quartz wafers on the opposite side of shutter panel means 36, i.e. output wafers 28-34, are also respectively associated with output paths (of which only one, path 60, is illustrated in FIG. 2). Generally reverse to the power splitting structure of FIG. 2 for each input wafer, each output wafer has summation means 62 also related to a plurality of optical output sub-paths 64-70, which preferably comprise etched optic glass waveguide means formed in their respective quartz wafers in a manner similar to wafer 20 and sub-paths 50-56. It is to be understood by those of ordinary skill in the art that output means 30-34 also each have their own respective summation means and optical output sub-paths, though generally not seen in the perspective view of present FIG. 2.

Generally operating on the same principles as discussed above with reference to present FIG. 1, planar shutter means 36 includes an array of segments 72. Such segments are spaced in an n row by m column array, for respective matching alignment with sub-parts of an n by m optical matrix defined with the given side edges 38 of respective parallel, spaced quartz wafers 20-26. As was the case with segment 12 in the FIG. 1 embodiment, each segment 72 is uniquely associated with an input side sub-path or sub-part and an output side sub-path or sub-part, so that selected actuation of the optical transmission characteristic (opaque or transparent) of such given segment permits selected transmission of optical signals through optical shutter panel means 36. Such actuation preferably is discretely and respectively controlled for each such segment by control signals along control lines 74 emanating from a processor or segment control means 76.

Segment control means 76 is generally represented as a keyboard-accessible computer, the programming of which for selected actuation of each segment 72 is readily apparent to those of ordinary skill in the art, without further explanation. More particularly, the precise manner, timing, etc., with which such actuations are selected is of broader interest only and forms no particular aspect of the present invention, aside from the understanding that selected actuation is utilized to control transmission of optical signals through shutter means 36. Selective actuation of the various segments achieves interconnection of selected input paths 40-46 and selected output paths 60, as discussed more fully below.

Each input path is split into a plurality of sub-paths associated with one of the m number of columns in shutter means 36, and each one of the output paths are associated with a plurality of output sub-paths distributed across the n number of rows of shutter means 36. The input and output sub-paths are uniquely associated with one another (i.e. aligned on opposite sides of shutter means 36) representing all possible one-on-one combinations of inputs to outputs. Accordingly, selection of given segments 72 for actuation (to permit optical transmission therethrough) provides a switching matrix which permits transmission of optical signals associated with one selected optical input to a selected optical output. For clarity, only a portion of the actuation control lines 74 between segments, 72 and segment control means 76 are illustrated.

While the FIG. 2 embodiment is provided as a four by four (n by m) array, is to be understood by those of ordinary skill in the art that other numbers of inputs and outputs may be provided in a given embodiment in accordance with the present invention. Also, while a relative amount of open space is illustrated with the FIG. 2 embodiment, it is to be understood that such aspect of the FIG. 2 illustration is principally to the benefit of the viewer, and that given constructions in accordance with the present invention may actually take the form of relatively small switching matrices, embodied essentially as modular chips, with optical or electrical lead lines for inputs, outputs, and control lines. For example, fiber optic cables may be on the order of 10 micrometers, or even smaller, with the remaining illustrated structure of FIG. 2 being of relative size thereto.

Figure 3:
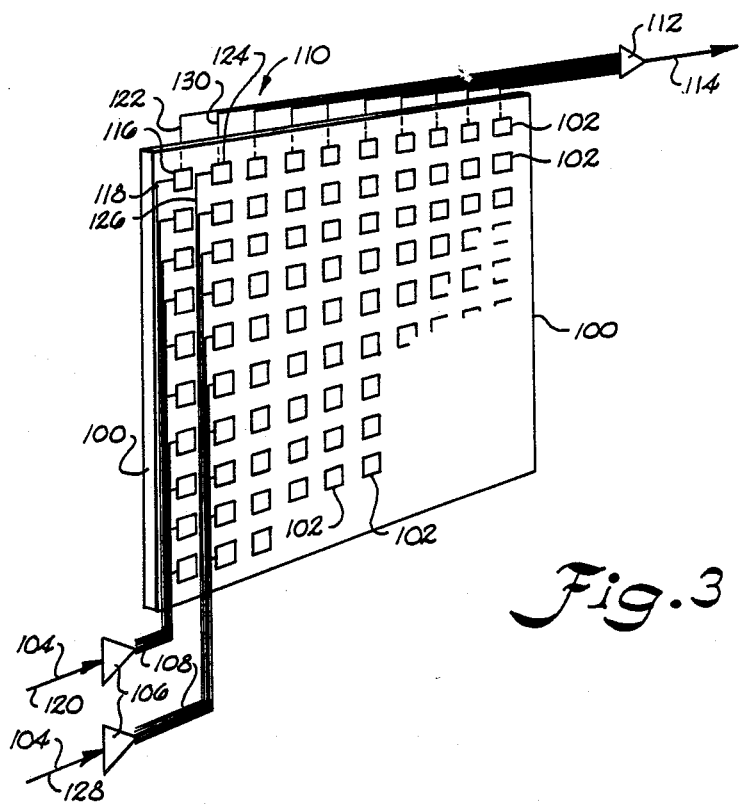
FIGS. 3 and 4 represent a general structural diagram and electrical conception diagram, respectively, of a 10×10 switching matrix embodiment in accordance with the present invention.

FIG. 3 illustrates another exemplary embodiment in accordance with the present invention, wherein an optoelectric shutter means 100 includes a 10 by 10 array of discretely controllable segments 102 (some of which are omitted for clarity in the drawing). Further for the sake of clarity, control lines for each segment 102, or control means therefor, are omitted.

As alluded to above, an electrical input signal may be provided along an electrical input line 104, and converted in a light transmitter means (such as a light emitting diode) 106 for driving a bundle 108 of fiber strands (in this instance, ten strands per bundle). Alternatively, a fused power splitter may be used for driving such ten fiber strands of each bundle 108. The respective strands are distributed along columns of segments 102, similar to the FIG. 2 embodiment discussed above. Only two such fiber bundles are illustrated (for the sake of clarity), though it is to be understood that the embodiment of FIG. 3 is adapted to accommodate 8 additional such bundles of ten fiber strands each. Such fiber strands may comprise conventional fiber optic cables or the like. Of course, the strands may alternatively be distributed along rows of the matrix (instead of columns), with the output side being summed perpendicularly thereto, i.e. along matrix columns.

While each strand in fiber bundles 108 is fused or otherwise associated with the input side of shutter means 100, a uniquely corresponding fiber strand or other optical waveguide means 110 is associated with the output side of its respective segment 102 (similar to the optical output sub-paths 64–70 of FIG. 2, supra). Only one bundle of optical output sub-paths 110 are illustrated, again for clarity, though nine additional such bundles could be accommodated by the exemplary embodiment of present FIG. 3. The output bundles are detected and amplified by light receiver/amplifier means 112, which converges the optical signals and provides an electrical signal output 114. An automatic gain control (AGC) amplifier is one way of maintaining input/output signal characteristics and parameters, regardless of the number of sub-paths summed to a given amplifier means 112.

As with the previous embodiment, actuation of a particular discrete segment determines between which optical input path and which optical output path optical signals may be transmitted through shutter means 100. For example, selected actuation of segment 116 so as to permit optical transmission therethrough (while blocking optical transmissions through all other segments 102) enables an optical signal in input sub-path 118 (originating with optical input path 120) to be transmitted through optical output sub-path 122 (associated with output 114). If segment 124 were actuated for optical transmission instead of segment 116, then an optical signal on optical input sub-path 126 (originating with input 128, instead of input 120) would be transmitted through shutter means 100 for output on line 114 via optical output sub-path 130.

Figure 4:
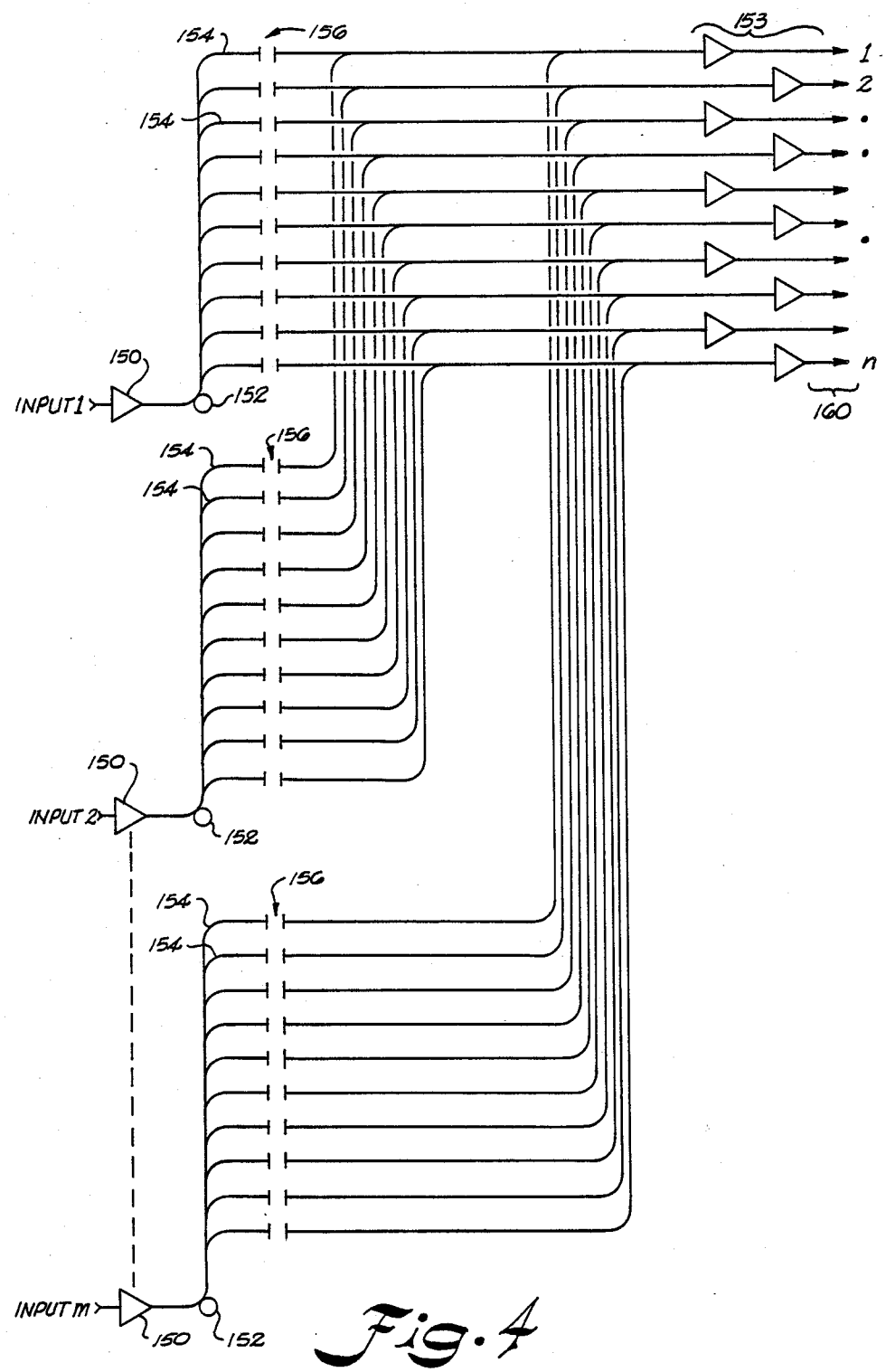

FIG. 4 depicts a schematic representation of corresponding input and output lines for a ten by m switching matrix. In particular, the schematic representation shows that a converter means 150 is associated with each input, input 1, input 2 . . . input m, for converting any electrical signals therein to optical signals. Alternatively, of course, converter means 150 may be omitted where optical signals are directly provided to the switching matrix. A fused optical channel power splitter 152 is schematically indicated with respect to each input channel for representing a power split of the optical signal for such respective line. In other words, where power splitting is practiced, an optical signal having a one watt input power level, and split equally among 10 optical input sub-parts would provide a 1/10 of a watt signal level in each such sub-path 154.

Relay structures 156 are illustrated as representative of electrically actuated optical shutter means described above with respect to planar shutter means 36 and 100. The FIG. 4 schematic illustration thus represents an alternative feature of the present invention, wherein such shutter means may be variously provided in the optical pathways (and sub-paths) used for the present invention, without necessarily being situated in a planar array. In any event, the summation means and receiver means 158 shown in representation in present FIG. 4 illustrate the schematic relationship which such summed outputs have to the various inputs 1, 2, . . . m, and to the outputs 160 of 1, 2, . . . ,n (wherein n is ten in the embodiment of present FIG. 4).

Preferably, the shutter means comprise LCD segments which are x-y matrix processor controlled, and have relatively extremely low power requirements, as understood by those of ordinary skill in the art. Furthermore, since optical waveguide means are used generally throughout the switching matrix of the present invention, fairly broad bandwidths, generally within a range of from about 0–30 GHZ, may be achieved. Likewise, input/output and channel-to-channel signal isolation of from 32 dB even to 100 dB may be achieved with the present invention. Furthermore, such relatively broad bandwidth capabilities permits switching of televideo and data lines, all by electronic processor control without requiring reconfiguration of the actual optical inputs and outputs.

In addition to the foregoing advantages, the present invention minimizes interface losses, and provides a switching module or matrix which is highly adapted to simultaneously handling security sensitive and non-sensitive signals (particularly due to the high signal isolation which may be achieved).

A given embodiment of the present invention, such as a four by four matrix as in present FIG. 2, or a ten by ten matrix as in present FIG. 3, may be comprised as a single chip or module for use in a building block approach to development of an overall switching device having a desired number of inputs and outputs (such as 100 each), with desired levels of signal separation both input-to-output and channel-to-channel (all as represented by the schematic illustration of present FIG. 4, showing an n by m array). When used in various parallel and/or series building block configurations, communication networks may be established for ground, satellite, space station, and space vehicle communication systems all possessing the low-power, high-speed, broad-band, high-isolation advantages discussed above. In addition, high-speed modulation and multiplexing techniques may be used in connection with control of the segment or shutter means actuations for coding or similar purposes.

While various particular and explicit exemplary embodiments of the present invention have been described above in detail, modifications and variation thereto may be practiced by those of ordinary skill in the art, all of which variations are intended to come within the spirit and scope of the present invention by virtue of present reference thereto. For example, in addition to the non-planar structure comprising the shutter means discussed above, various partially mechanical shutters and the like could be provided in accordance with the present invention, still preserving the input-to-output reconfiguration advantages of the present invention, without requiring physical re-connection of optical inputs and outputs.

Also in connection with such shutter means, while segment actuations between the two general states of opaque and transparent have been discussed, other signal attenuation levels may be utilized and defined as respective "on" and "off" conditions. In other words, other modulations of optical transmissions through the respective shutter means segments may be practiced, with various interpretations and uses made of the signals variously transmitted through such shutter means. In fact, shutter means may be utilized, in desired embodiments, with various optical stop settings between fully opaque and fully transparent.

In addition to the foregoing alternative uses of the present invention, it is to be understood that the embodiments herein disclosed, and variations thereof, may be utilized for simultaneously passing more than one optical signal between respective, selected pairs of inputs and outputs. In other words, by proper actuation of the discrete shutter means segments or their functional equivalents, a first desired signal may be passed between a first selected input and a first selected output, while a second desired signal is simultaneously passed between a second desired input and corresponding second desired output. As understood by those of ordinary skill in the art, multiple simultaneous segment actuations can also lead to distribution of various input signals to more than one output line.

The present invention may be readily adapted for switching a variety of electrical and/or optical signals (on either electrical signal or optical signal command). Moreover, separate modules may be formed, e.g., one with only direct electrical interfaces for signals and control, and another with optical and electrical interfaces for signals and controls, respectively.

While various switching matrices or modules may be provided in accordance with the present invention, such as for accommodating only optical input signals, or only electrical input signals, or mixtures thereof, all such embodiments provide an optical shutter switching matrix which permits transmission of a given optical signal from selected optical inputs to selected optical outputs, further aspects of the present invention being set forth more particularly in the appended claims.

What is claimed is:

1. An apparatus for switching selected optical inputs to selected optical outputs, comprising:
   m number of optical inputs, each of said inputs respectively split into n number of optical sub-part rows and disposed so as to constitute an n row by m column optical matrix;
   planar shutter means operatively associated with said optical matrix, with an array of n by m segments spaced for respective matching alignment with sub-parts of said n by m optical matrix, the transparency of each segment being respectively controllable, and the position of each segment being uniquely associated with one of said optical sub-parts so as to enable control of optical signals therethrough emanating from a selected optical input; and
   n number of optical summation means for respectively summing optical signals selectively output through respective n rows of said planar shutter means array, so as to form n number of respective optical outputs, whereby selected control of said planar shutter means segments permits optical signals applied to selected of said m optical inputs to be optically transmitted through said shutter means to selected of said n optical outputs.

2. An apparatus as in claim 1, wherein both said m number of optical inputs and said n number of optical outputs are respectively equal to 4.

3. An apparatus as in claim 1, wherein both said m number of optical inputs and said n number of optical outputs are respectively equal to 10.

4. An apparatus as in claim 1, further comprising:
   input converter means for converting respective electrical input signals into optical input signals and respectively applying same to said m number of optical inputs; and
   output converter means for respectively converting optical output signals output through each of said n number of optical outputs into respective electrical output signals.

5. An apparatus as in claim 4, wherein:
   said input converter means comprise light emitting diode modules for converting electrical signals to optical signals; and
   said output converter means comprise injection laser diode modules for converging optical signals info electrical signals.

6. An apparatus as in claim 1, wherein:
   said optical inputs and optical outputs include optical waveguide means such as fiber optic cables;
   said optical summation means include automatic gain control means for establishing relatively constant amplitude optical outputs; and
   said shutter means segments comprise electronically-controllable optical switching means for operating on relatively low power inputs.

7. An apparatus as in claim 6, wherein:

said electronically-controllable optical switching means comprise an array of normally opaque LCD segments, which may be discretely and selectively rendered transparent by electrical actuation thereof; and said apparatus further comprises control means for selectively electrically actuating each respective said LCD segment so as to render same transparent.

8. An apparatus as in claim 1, wherein said optical inputs and said optical outputs include relatively high-isolation, optical waveguide means, including optical glass pathways defined through relatively non-transmissive quartz planar members.

9. An apparatus as in claim 1, wherein:
said optical inputs and said optical outputs include respective pluralities of parallel, spaced quartz crystalline wafers with broad-band optical glass pathwaves defined therein;
said shutter means segments include opto-electronic transmissive low power shutter window means which may be x-y matrix processor controlled for respective optical transmission therethrough; and
wherein said apparatus further comprises controller means for selectively actuating said low-power shutter window means; whereby said apparatus provides electronically controlled relatively low-power, high-isolation switching of broad-band signals.

10. An optical shutter switching matrix for switching optical signals associated with any one of a plurality of optical input paths to any one of a plurality of optical output paths, said switching matrix comprising:
a plurality of optical input means, each one of said input means having a respective optical input path and further having respective splitter means for splitting its optical input path into a number of input sub-paths;
a plurality of optical output means, oriented perpendicularly to said optical input means, each one of said output means having a respective optical output path and further having respective summation means for summing a number of output sub-paths to form its respective optical output path;
an electrically-controllable optical shutter matrix means, having an array of discrete, controllably transparent segments, said shutter matrix means being situated between said optical input means and said optical output means so that said optical input sub-paths and said optical output sub-paths respectively align on opposite sides of said segments; and
shutter matrix segment control means for selectively controlling optical transmission through each respective segment of said optical shutter matrix means, so that optical signals directed along selected optical input paths may be switched to selected optical output paths.

11. A switching matrix as in claim 10, wherein:
said optical input means and said optical output means include respective sets of parallel, spaced, relatively non-transmissive, quartz wafers with broad-band optical glass pathways defined in the respective planes of such wafers for forming said sub-paths;
said segments include LCD elements which are normally either opaque or transparent when unactuated, and in the reverse state when electrically actuated; and said segment control means includes a processor with x-y coordinate control over each respective segment for electrically atuating same to select an opaque or transparent state therefor for control of optical transmission therethrough, whereby an appropriate segment uniquely aligned with a given optical input sub-path and optical output sub-path may be selectively actuated for transmitting an optical signal between their respective selected optical input path and selected optical output path.

12. A switching matrix as in claim 10, further comprising:
electrical input means for receiving electrical input signals and converting same respectively into optical input signals for input along said respective optical input paths; and
electrical output means for receiving optical output signals from said respective optical output paths and converting same into respective electrical output signals.

13. A switching matrix as in claim 10, wherein:
said plurality of optical input means and said plurality of said optical output means respectively comprise 10 in number;
said optical paths and sub-paths comprise broad-band pathways for accommodating signals within a zero to 30 GHZ bandwidth; and
a plurality of such switching matrices are assembled in a configuration having 100 respective optical input paths and 100 respective optical output paths, with optical signals being controllably switchable input to output.

14. A switching matrix as in claim 10, comprising two or more of such switching matrices in series-related stages to achieve desired values of input path to output path optical signal isolation.

15. A device for electronically re-configuring interconnections between selected broad-band optical inputs and selected broad-band optical outputs, without requiring physical re-connecting of said inputs or outputs, and while maintaining relatively high signal isolation input-to-output and channel-to-channel, said device comprising:
a plurality of parallel, spaced input quartz wafers, each input wafer having etched optical splitter path means for receiving a respective optical input and splitting same into a plurality of optical sub-inputs distributed in alignment along a given edge of the respective wafer;
a planar shutter panel, oriented perpendicularly to said input wafers and situated along said given edges thereof, said panel having an array of discretely-controllable segments, the optical transmissiveness of which may be respectively electrically controlled, said segments being formed in said shutter panel so as to respectively correspond to and align with said optical sub-inputs along said given edges of said input wafers;
a plurality of parallel, spaced output quartz wafers mutually perpendicular with both said input wafers and said planar shutter panel, each output wafer having etched optical summer means for receiving respective optical sub-outputs distributed in alignment along a given edge of the respective wafer, and for power summing same into respective optical outputs for each output wafer, said output wafers being situated with their respective given edges adjacent said planar shutter panel such that said optical sub-outputs uniquely correspond to and align with said planar shutter panel segments; and segment control means for electrically controlling optical transmissions through said respective shutter panel segments, whereby a selected optical input is interconnected with a selected optical output by appropriate control of the shutter panel segment which uniquely interfaces between the optical sub-inputs associated with such selected optical input and the optical sub-outputs associated with such selected optical output.

16. A device as in claim 15, wherein the bandwidth of said broad-band optical inputs and outputs is generally within a range of 0-30 GHZ.

17. A device as in claim 15, wherein said relatively high signal isolation is generally within a range from about 32 dB to about 100 dB.

18. A device as in claim 15, wherein:
said input quartz wafers and said output quartz wafers are situated on respective sides of said planar shutter panel and fused thereto;
said optical inputs and said optical outputs comprise respectively ten in number; and
said device comprises a building block component for selected arrangement with other such devices in parallel and/or in series configuration, for handling selected numbers of inputs and outputs greater than ten, and with selected signal separation.

19. A device as in claim 15, further comprising electrical signal converter means for converting electrical inputs and outputs, respectively, to and from optical signals, for accommodating selected transmission of same through said optical inputs and outputs.

* * * * *